US012548955B2

(12) United States Patent
Huang et al.

(10) Patent No.: US 12,548,955 B2
(45) Date of Patent: Feb. 10, 2026

(54) CONNECTOR AND CONNECTOR ASSEMBLY

(71) Applicants: Tyco Electronics (Suzhou) Ltd., Suzhou (CN); Tyco Electronics Technology (SIP) Ltd., Suzhou (CN)

(72) Inventors: Jianlin Huang, Suzhou (CN); Feng (Carlos) Pan, Suzhou (CN); Weiguo (Vic) Sun, Suzhou (CN)

(73) Assignees: Tyco Electronics Technology (SIP) Ltd., Suzhou (CN); Tyco Electronics (Suzhou) Ltd., Suzhou (CN)

( * ) Notice: Subject to any disclaimer, the term of this patent is extended or adjusted under 35 U.S.C. 154(b) by 457 days.

(21) Appl. No.: 18/147,835

(22) Filed: Dec. 29, 2022

(65) Prior Publication Data

US 2023/0216253 A1 Jul. 6, 2023

(30) Foreign Application Priority Data

Dec. 31, 2021 (CN) ......................... 202123416939.0

(51) Int. Cl.
*H01R 13/74* (2006.01)
*H01R 13/52* (2006.01)
*H01R 13/6585* (2011.01)

(52) U.S. Cl.
CPC ....... *H01R 13/748* (2013.01); *H01R 13/5202* (2013.01); *H01R 13/6585* (2013.01); *H01R 2201/04* (2013.01)

(58) Field of Classification Search
CPC .............................. H01R 12/00; H01R 12/724
USPC ............................................................ 439/79
See application file for complete search history.

(56) References Cited

U.S. PATENT DOCUMENTS

| | | | | |
|---|---|---|---|---|
| 2015/0024629 | A1* | 1/2015 | Snader | H01R 13/748 29/883 |
| 2017/0271823 | A1* | 9/2017 | Zhao | H01R 13/6585 |
| 2021/0281027 | A1* | 9/2021 | Chang | H01R 13/5202 |
| 2022/0224064 | A1 | 7/2022 | Huang et al. | |

FOREIGN PATENT DOCUMENTS

| | | | |
|---|---|---|---|
| CN | 214849171 | U | 11/2021 |
| DE | 19836777 | A1 | 2/1999 |
| EP | 2367236 | A1 | 9/2011 |
| EP | 3499648 | A1 | 6/2019 |
| JP | 2004362928 | A | 12/2004 |

OTHER PUBLICATIONS

Extended European Search Report dated May 17, 2023, corresponding to Application 22216950.0-1201, 12 pages.
European Patent Office Examination Report dated Apr. 22, 2025, corresponding to Application No. 22 216 950.0-1201, 11 pages.

* cited by examiner

*Primary Examiner* — Phuong K Dinh
(74) *Attorney, Agent, or Firm* — Barley Snyder

(57) ABSTRACT

A connector comprises a housing adapted to be mounted on a mounting panel and a terminal fixed within the housing. The housing includes a body, a base formed on a bottom of the body and a tongue protruding from the bottom of the base. The base is adapted to be fixed on one side of the mounting panel. A first positioning post is formed on the base for mating with a first positioning hole formed in the mounting panel to locate the housing at a predetermined position with respect to the mounting panel. The tongue is adapted to pass through an installation opening formed in the mounting panel to connect a circuit board.

20 Claims, 11 Drawing Sheets

CONNECTOR AND CONNECTOR ASSEMBLY

CROSS-REFERENCE TO RELATED APPLICATIONS

This application claims the benefit of Chinese Patent Application No. CN202123416939.0 filed on Dec. 31, 2021 in the State Intellectual Property Office of China, the whole disclosure of which is incorporated herein by reference.

FIELD OF THE INVENTION

The present invention relates to a connector and a connector assembly including the connector.

BACKGROUND

In the prior art, a connector adapted for use in a laser radar system generally includes a housing having terminals provided therein for transmitting power, control and/or data signals, by way of example only. The connector is typically mounted directly on a circuit board and electrically connected thereto. However, in some applications, the connector is not mounted directly to the circuit board, but rather on a mounting panel. In existing connector systems, no positioning structure between the connector and the circuit board are provided. Thus, the relative position between the connector and the circuit board cannot be accurately guaranteed. This can affect the electrical connection between the terminal of the connector and the circuit board, and even cause the electrical connection to fail entirely.

SUMMARY

According to an embodiment of the present disclosure, a connector comprises a housing adapted to be mounted on a mounting panel and a terminal fixed within the housing. The housing includes a body, a base formed on a bottom of the body and a tongue protruding from the bottom of the base. The base is adapted to be fixed on one side of the mounting panel. A first positioning post is formed on the base for mating with a first positioning hole formed in the mounting panel to locate the housing at a predetermined position with respect to the mounting panel. The tongue is adapted to pass through an installation opening formed in the mounting panel to connect a circuit board.

BRIEF DESCRIPTION OF THE DRAWINGS

The invention will now be described by way of example with reference to the accompanying Figures, of which.

DETAILED DESCRIPTION OF THE EMBODIMENTS

Figure 1:
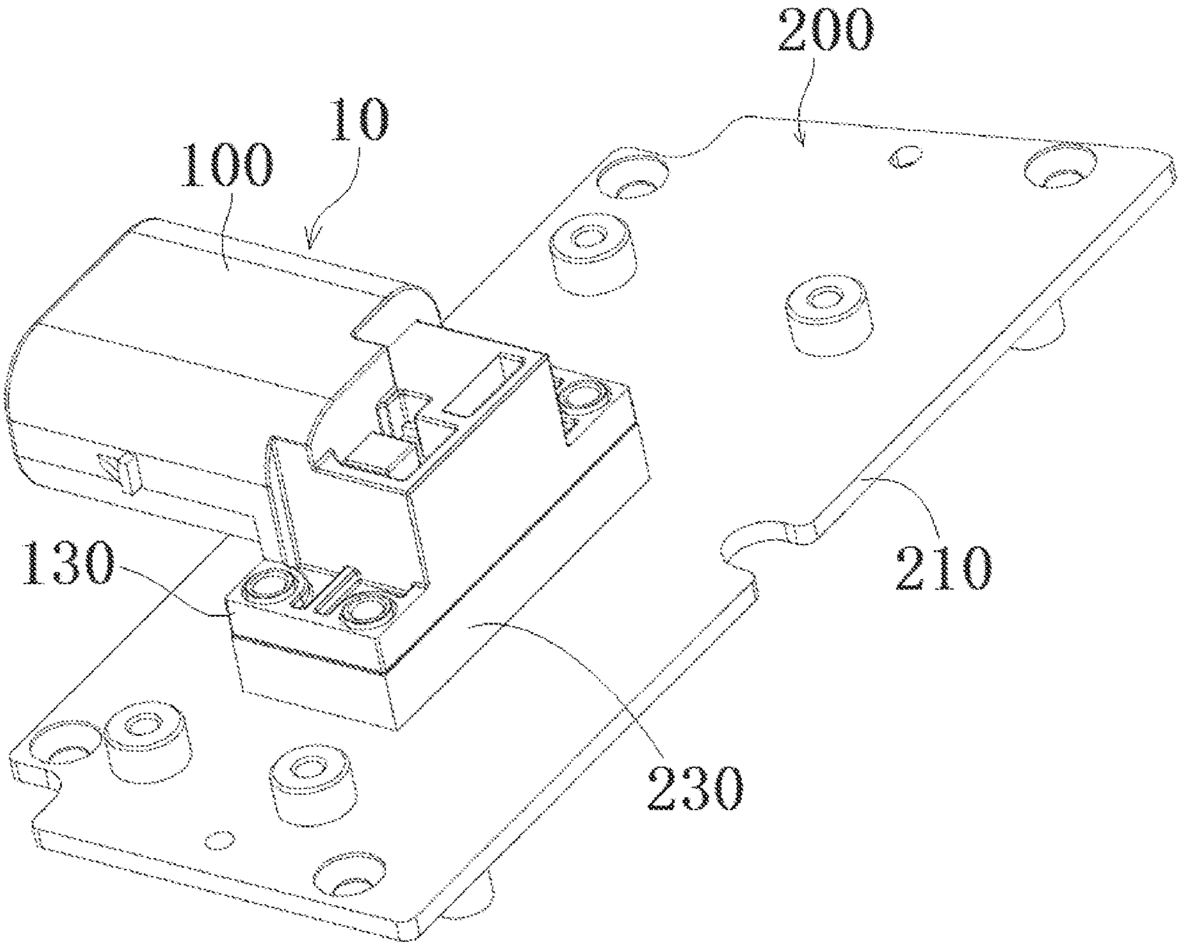
FIG. 1 shows an illustrative perspective view of a connector assembly according to an exemplary embodiment of the present invention when viewed from the top.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a connector comprises a housing adapted to be mounted on a mounting panel, and a terminal fixed within the housing. The housing includes a body part, a base part formed on the bottom of the body part and adapted to be fixed on one side of the mounting panel, and a tongue part protruding from the bottom of the base part. The tongue part is adapted to pass through an installation opening formed in the mounting panel to connect a circuit board. A first positioning post is formed on the base part for mating with a first positioning hole formed in the mounting panel to locate the housing at a predetermined position with respect to the mounting panel.

According to another embodiment of the present disclosure, a connector assembly comprises a mounting panel formed with an installation opening, and a connector according to the above-described embodiment. The connector is mounted at a predetermined position on one side of the mounting panel. A second positioning post is formed on the other side of the mounting panel. The second positioning post is adapted to mate with a positioning hole formed in a circuit board.

Figure 2:
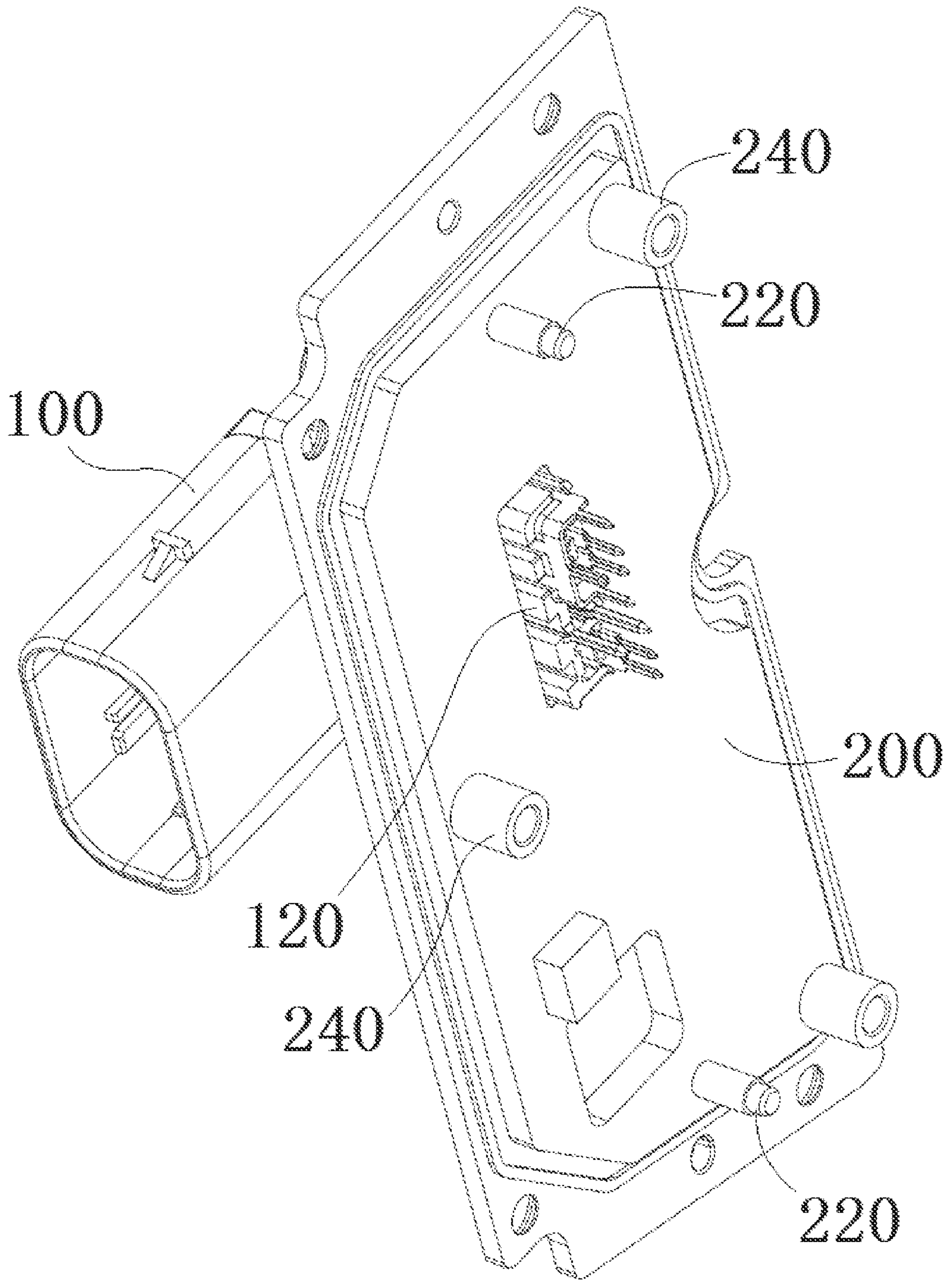
FIG. 2 shows an illustrative perspective view of a connector assembly according to an exemplary embodiment of the present invention when viewed from the bottom.
Figure 3:
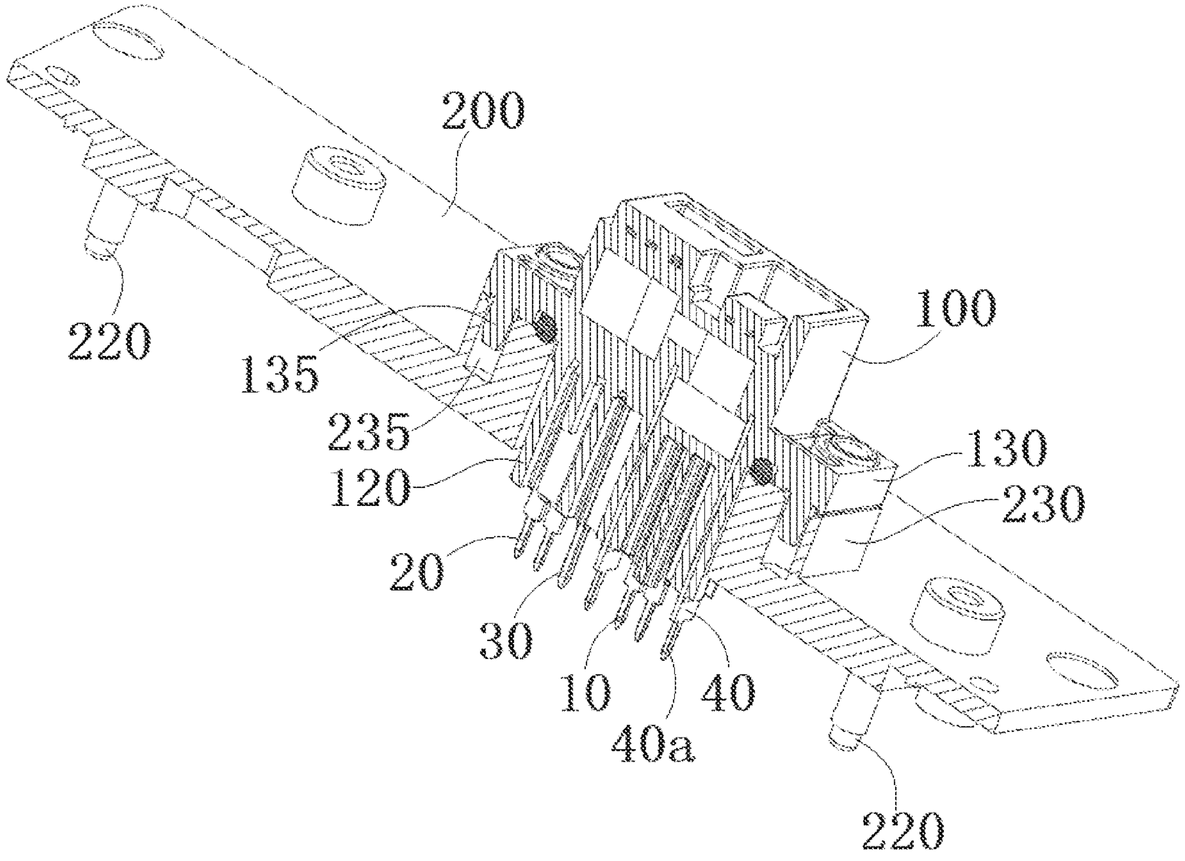
FIG. 3 shows a cross-sectional view of a connector assembly according to an exemplary embodiment of the present invention.
Figure 4:
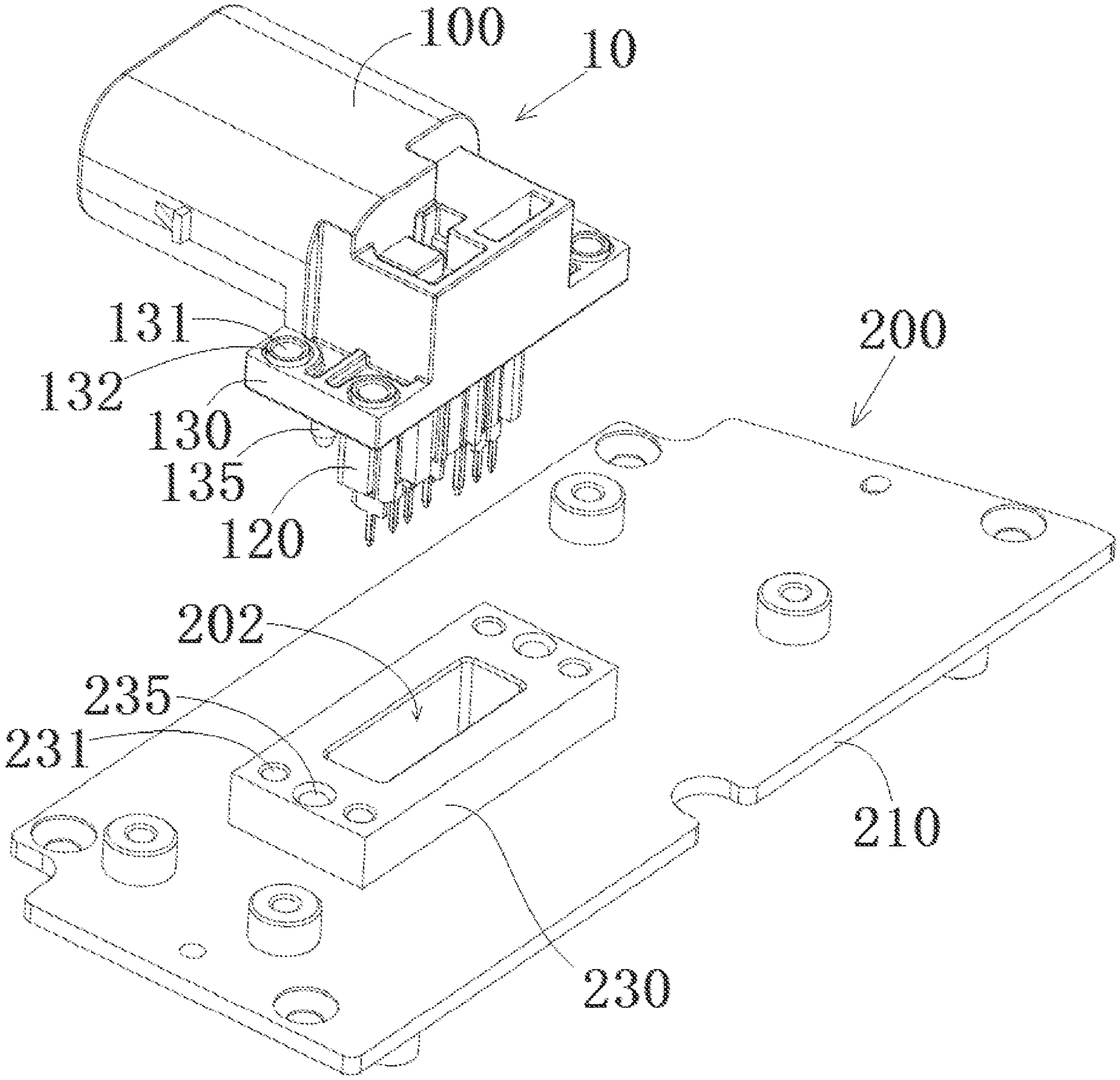
FIG. 4 shows an exploded schematic view of a connector assembly according to an exemplary embodiment of the present invention.

FIG. 1 shows an illustrative perspective view of a connector assembly according to an exemplary embodiment of the present invention when viewed from the top. FIG. 2 shows an illustrative perspective view of a connector assembly according to an exemplary embodiment of the present invention when viewed from the bottom. FIG. 3 shows a cross-sectional view of a connector assembly according to an exemplary embodiment of the present invention. FIG. 4 shows an exploded schematic view of a connector assembly according to an exemplary embodiment of the present invention.

Referring to FIGS. 1-4, the illustrated connector assembly includes a connector 10 and a mounting panel 200. The mounting panel 200 is formed with an installation opening 202. The connector 10 includes a housing 100. The housing 100 is mounted on one side of the mounting panel 200. The connector 10 is suitable for use with, for example, a laser radar system, and may include a power terminal for transmitting power and a signal terminal for transmitting a signal (e.g., an Ethernet signal). In the illustrated embodiment, the connector 10 is adapted to be fixedly connected to the mounting panel 200. The connector 10 further includes terminals 10, 20 and 30 fixedly supported within the housing 100.

Figure 11:
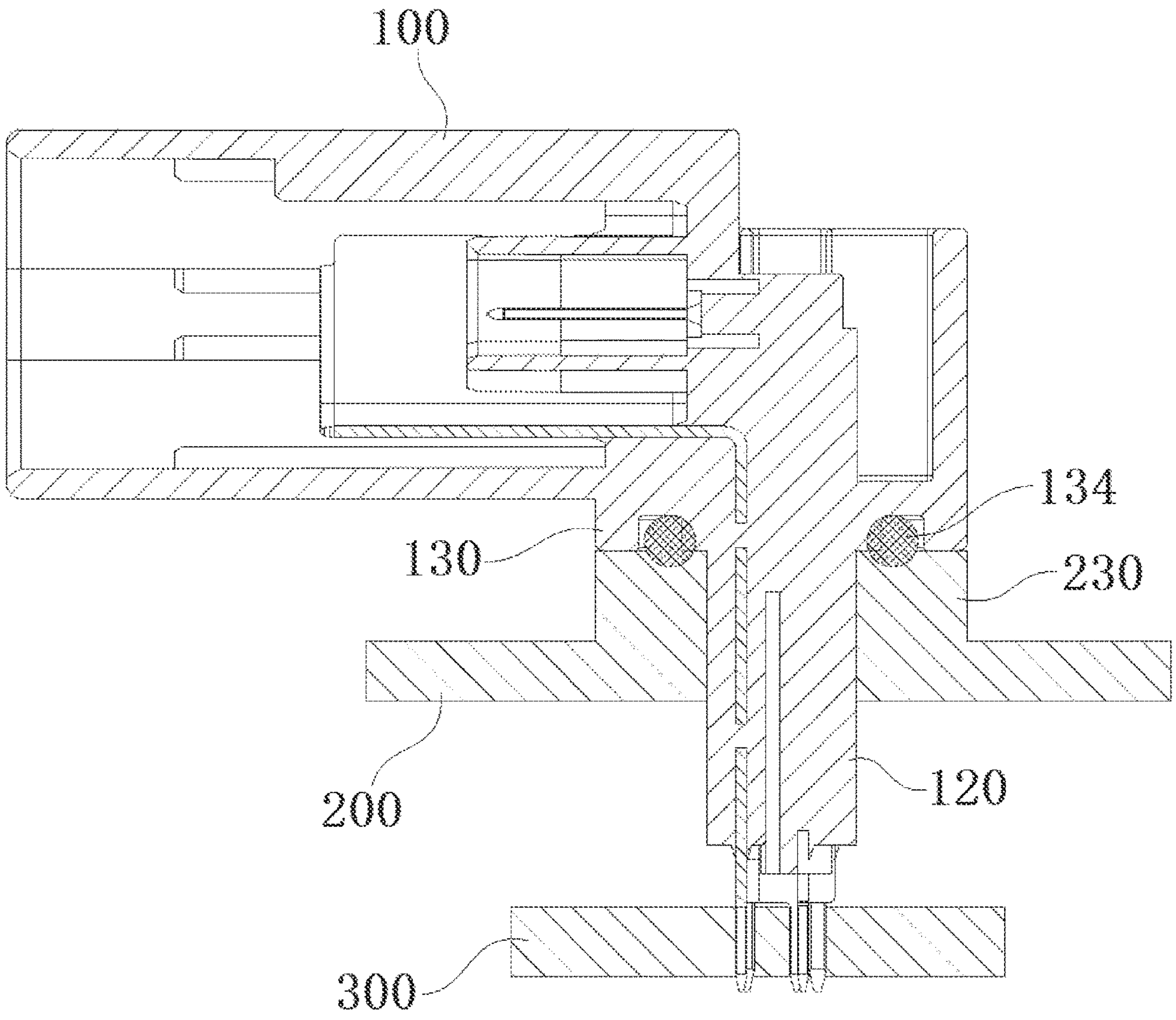
FIG. 11 shows a cross-sectional view of a connector, a mounting panel and a circuit board according to an exemplary embodiment of the present invention.

The housing 100 further comprises a base part 130 and a tongue part 120. The base part 130 is adapted to be fixed on one side of the mounting panel 200. The tongue part 120 protrudes from the bottom of the base part 130 and may extend through the mounting panel 200 via the installation opening 202 to connect to a circuit board 300, as shown in FIG. 11. A first positioning post 135 is formed on the base part 130 and is sized to fit a first positioning hole 235 formed in one side of the mounting panel 200 such that the housing 100 is provided at a predetermined position or location with respect to the mounting panel 200. The base part 130 is formed on the bottom of a body part 110 of the housing 100 and is fixed to one side of the mounting panel 200.

Figure 9:
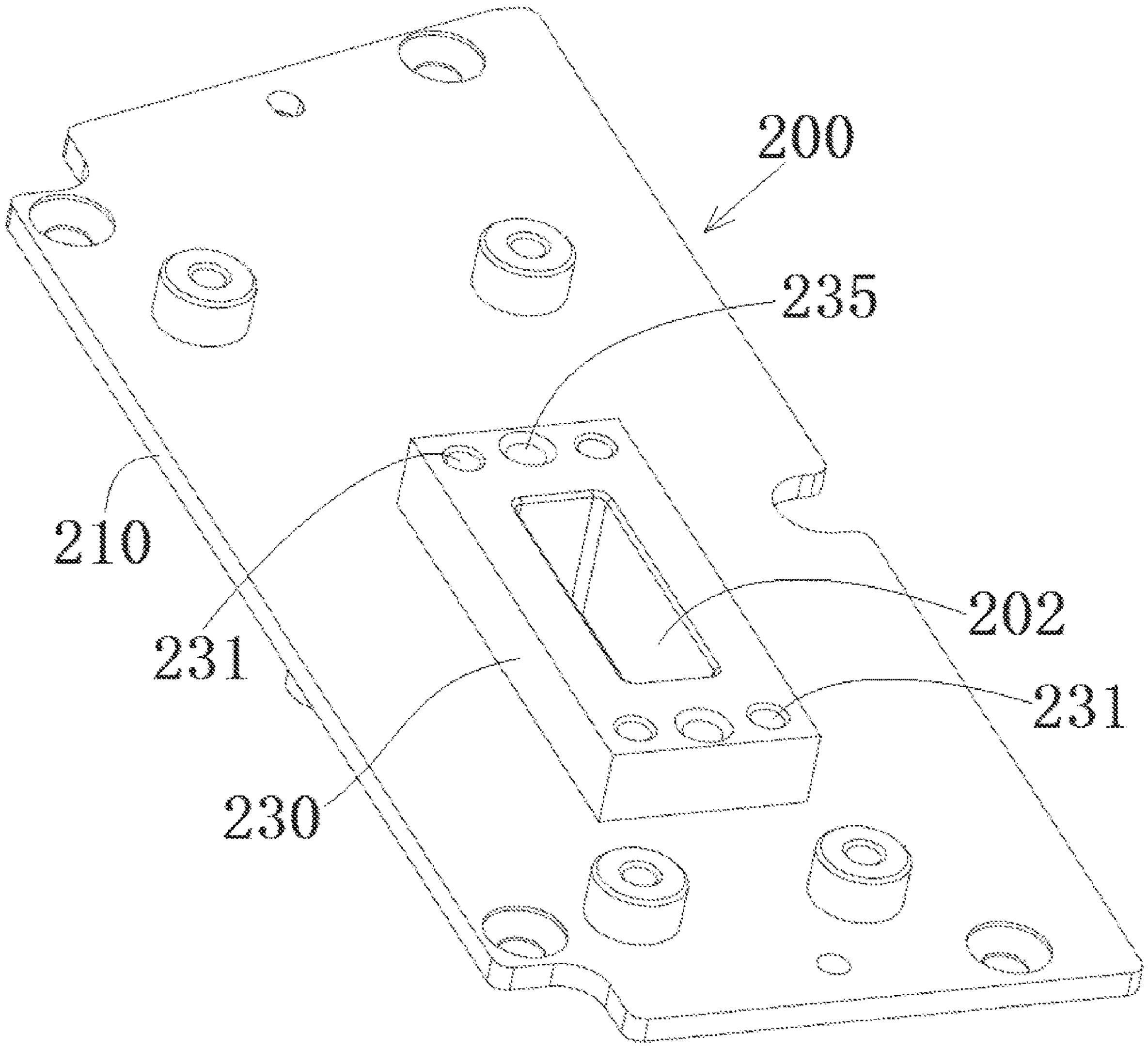
FIG. 9 shows an illustrative perspective view of a mounting panel according to an exemplary embodiment of the present invention when viewed from the top.
Figure 10:
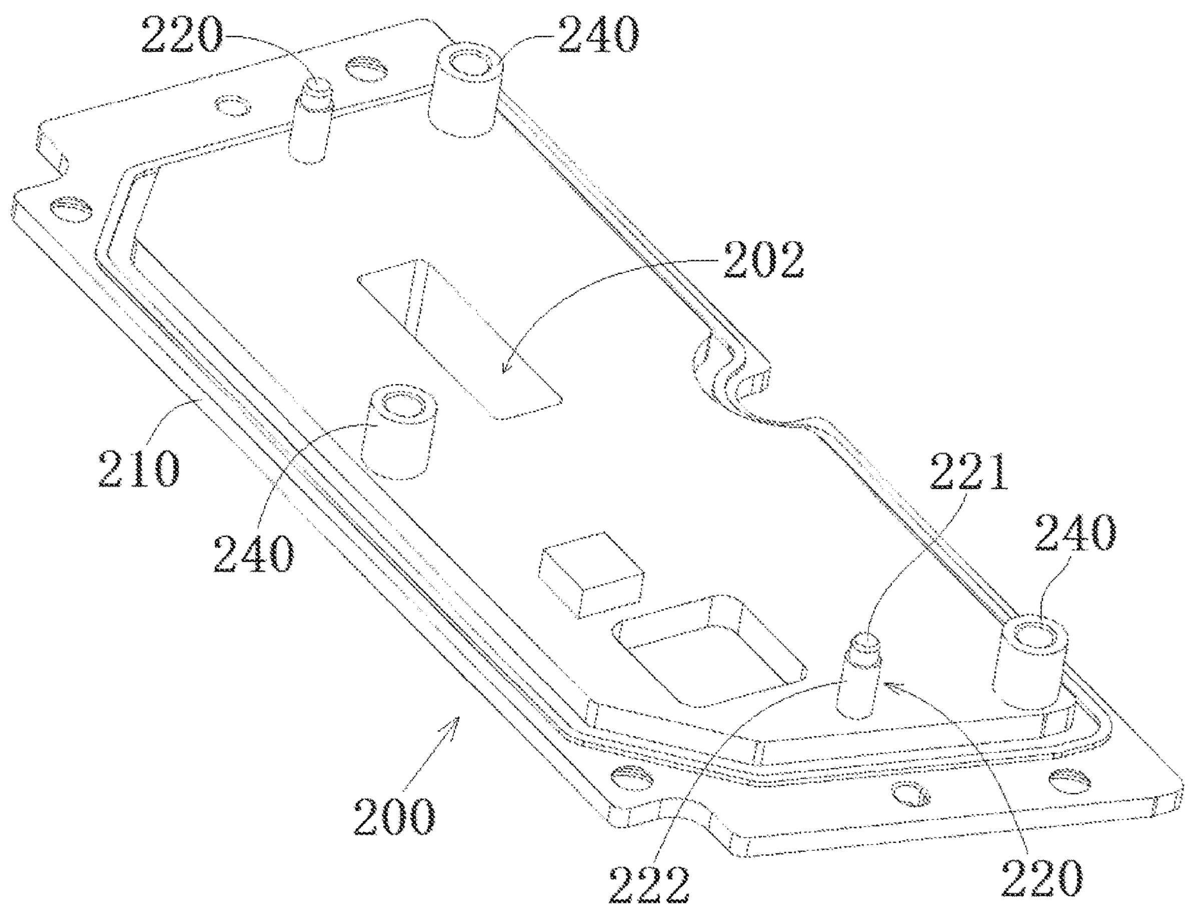
FIG. 10 shows an illustrative perspective view of a mounting panel according to an exemplary embodiment of the present invention when viewed from the bottom.

FIG. 9 is a perspective view of the mounting panel 200 according to an exemplary embodiment of the present invention when viewed from the top. FIG. 10 shows an illustrative perspective view of the mounting panel 200 according to an exemplary embodiment of the present invention when viewed from the bottom.

As shown in FIGS. 1-4 and 9-10, a second positioning post 220 is formed on a side of the mounting panel 200 opposite the first positioning hole 235, and is adapted to mate with a positioning hole (not shown) formed in the circuit board 300 (see FIG. 11). The mounting panel 200 includes a plate-shaped body 210 and a mounting boss 230. The plate-shaped body 210 has a first surface and a second surface opposite to the first surface in the thickness direction of the plate-shaped body. The mounting boss 230 is formed on the first surface of the plate-shaped body 210 and protrudes a predetermined height with respect to the first surface. The base part 130 is fixed to an installation surface of the mounting boss 230. The first positioning hole 235 and the installation opening 202 are formed in the mounting boss 230. In the illustrated embodiment, the mounting boss 230 ensures that the body part 110 of the housing 100 is spaced apart from the plate-shaped body 210 of the mounting panel 200 to prevent the body part from interfering with the mounting panel.

As shown in FIGS. 1-4 and 9-10, a connection hole 131 is formed in the base part 130, and a threaded hole 231 is formed in the mounting boss 230. The connector assembly also includes a threaded member (e.g., a screw), which passes through the connection hole 131 and is screwed into the threaded hole 231 to fix the housing 100 to the mounting panel 200. The connector 10 further includes a metal bushing 132 fitted in the connection hole 131 of the base part 130. The threaded member passes through the metal bushing 132. In this way, it is possible to prevent the threaded member from directly contacting the inner wall of the connection hole 131, thereby preventing the housing 100 from being worn by the threaded member.

The second positioning post 220 is formed on the second surface of the plate-shaped body 210. A support post 240 for supporting the circuit board 300 is also formed on the second surface of the plate-shaped body 210. The support post 240 is adapted to support the circuit board 300 at a position distanced from the second surface of the plate-shaped body 210 by a predetermined distance. The second positioning post 220 includes a post end 221 and a post base 222. The post end 221 is adapted to be inserted into the positioning hole formed in the circuit board 300 to position the circuit board 300. The diameter of the post base 222 is larger than that of the post end 221 and is provided coaxially with the post end 221. The end face of the support post 240 and the end face of the post base 222 are in the same plane, and are used to simultaneously abut against the circuit board 300 to provide support thereto.

Figure 5:
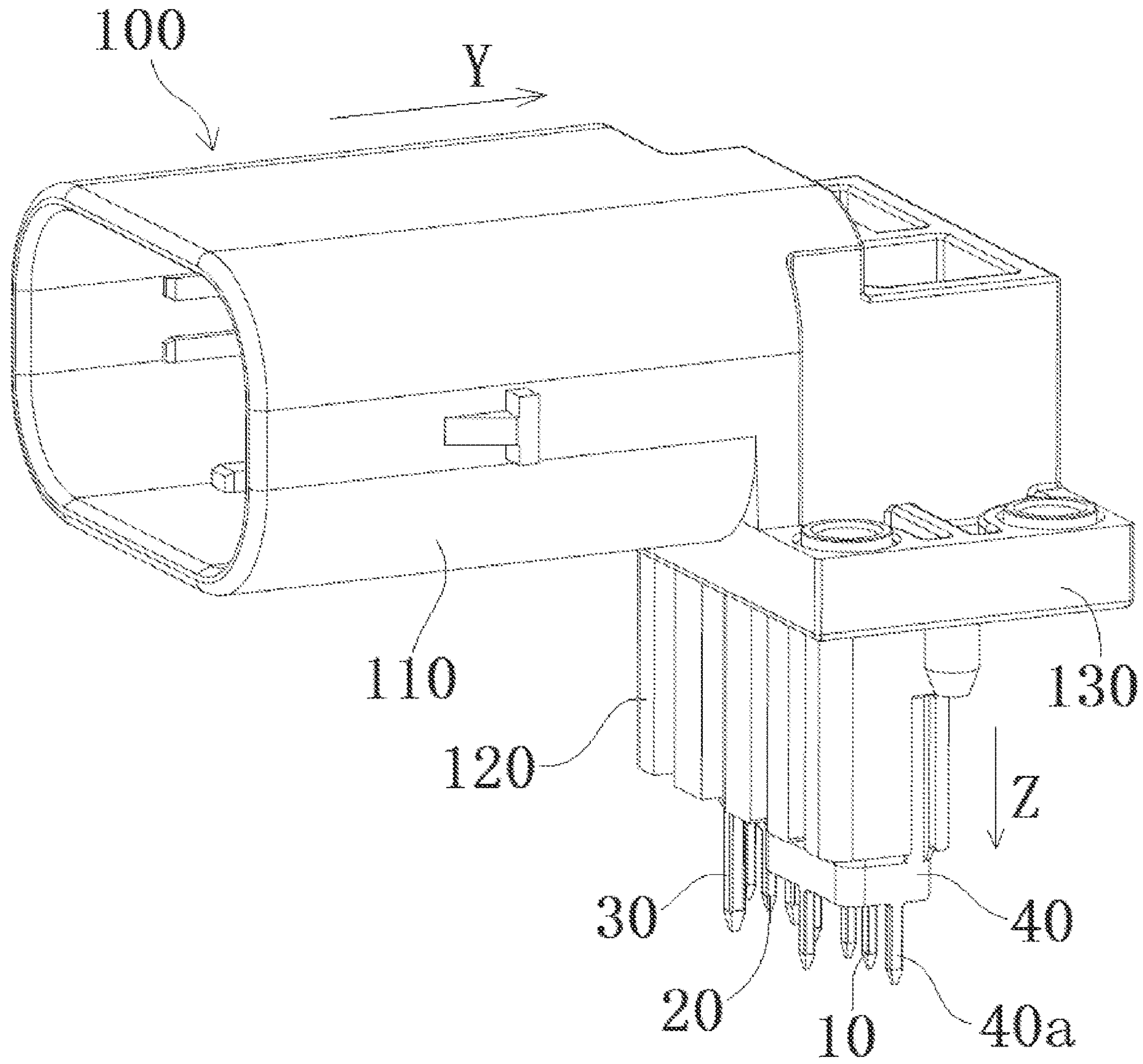
FIG. 5 shows an illustrative perspective view of a connector according to an exemplary embodiment of the present invention when viewed from the top.
Figure 6:
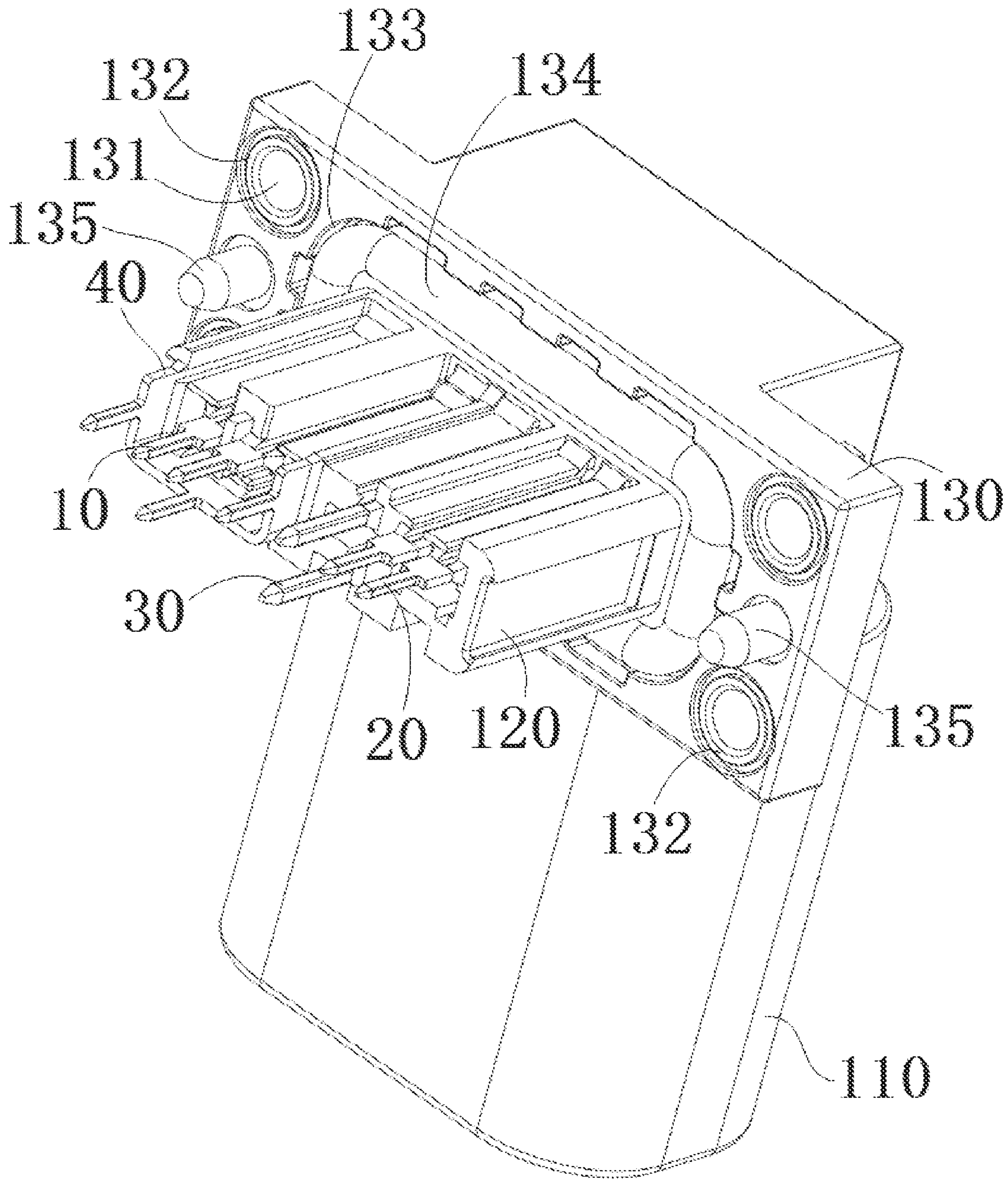
FIG. 6 shows an illustrative perspective view of a connector according to an exemplary embodiment of the present invention when viewed from the bottom.
Figure 7:
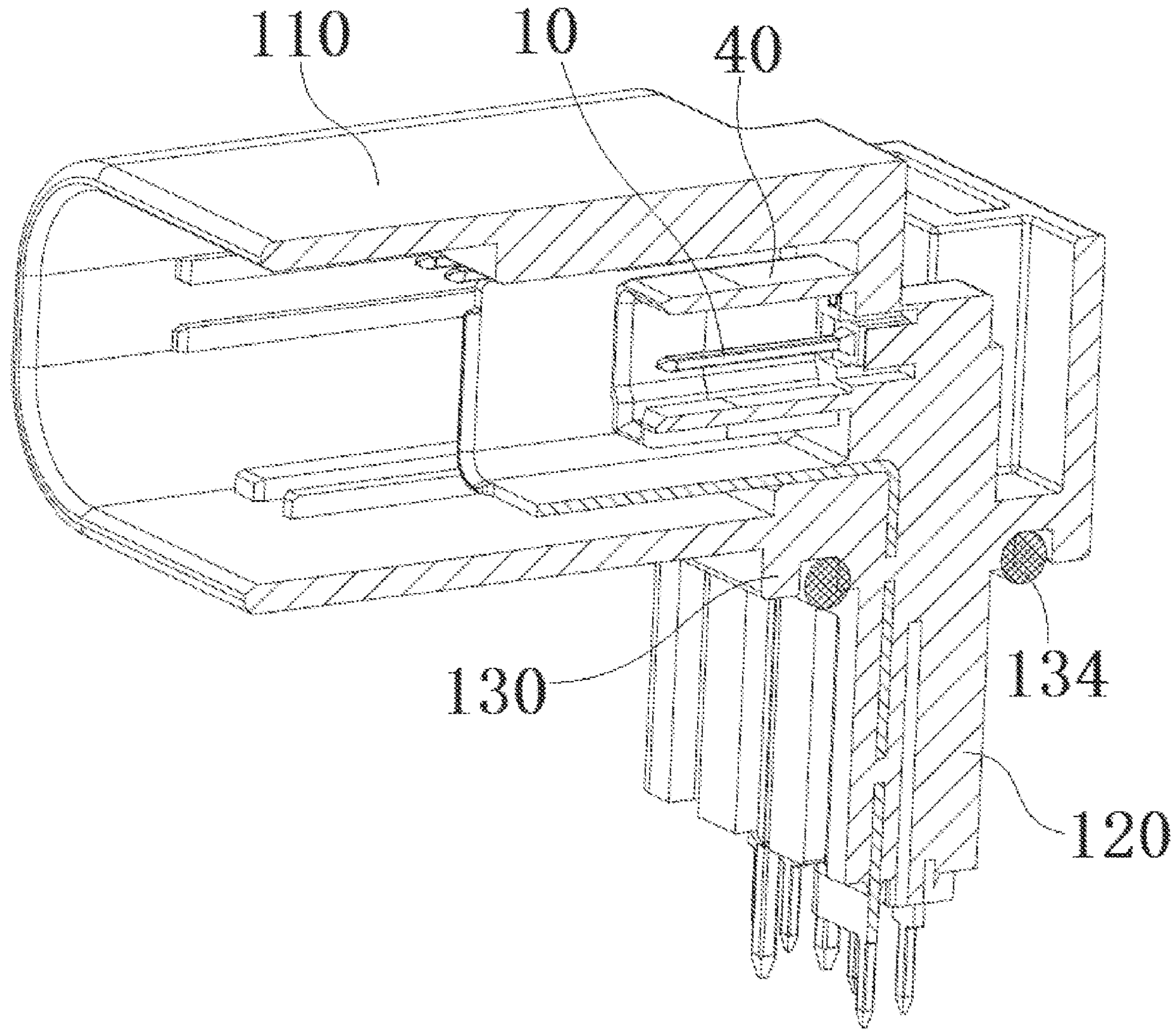
FIG. 7 shows a cross-sectional view of a connector according to an exemplary embodiment of the present invention.
Figure 8:
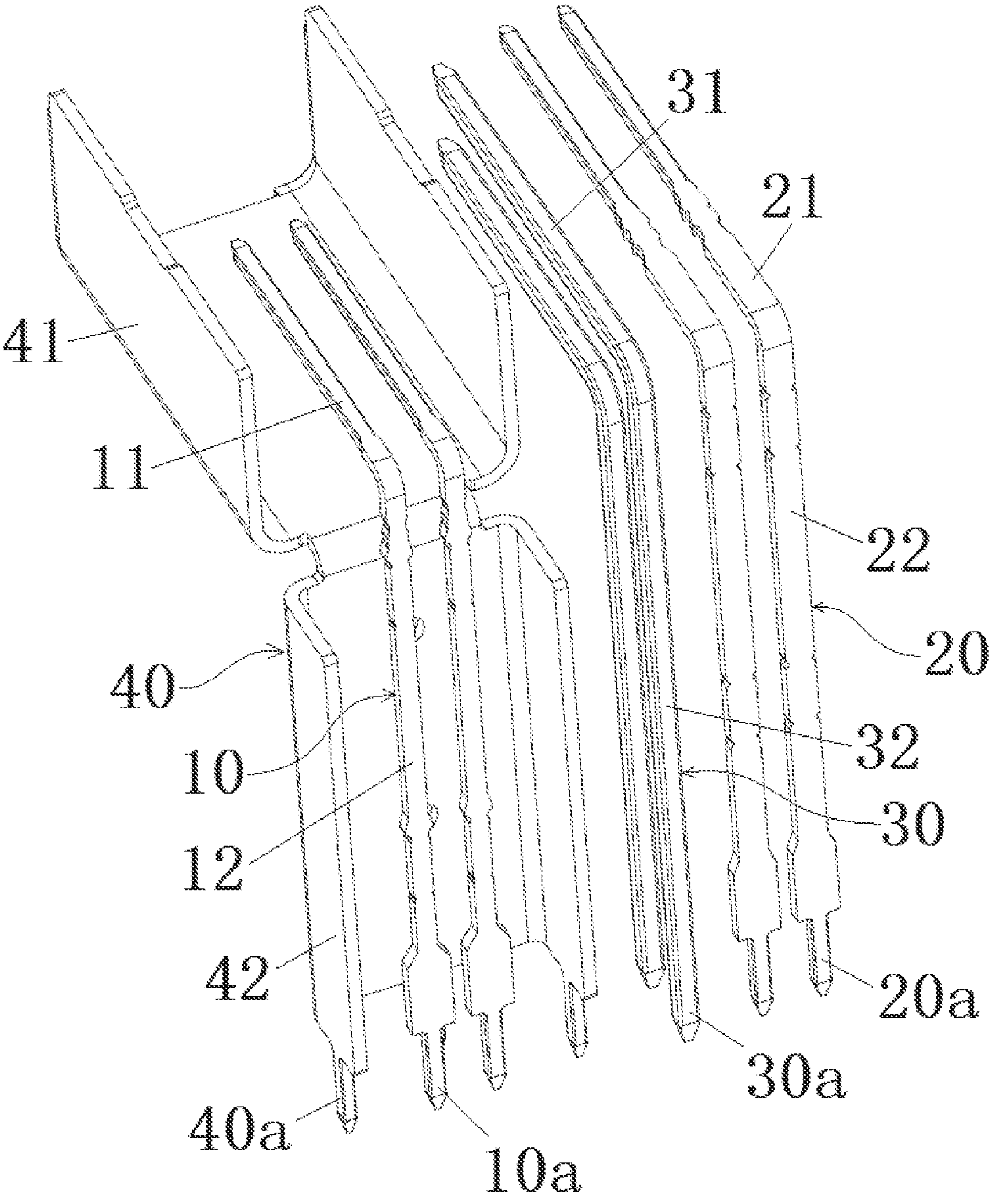
FIG. 8 shows an illustrative perspective view of a terminal and an electromagnetic shield in a connector according to an exemplary embodiment of the present invention.

FIG. 5 shows an illustrative perspective view of the connector 10 according to an exemplary embodiment of the present invention when viewed from the top. FIG. 6 shows an illustrative perspective view of the connector 10 according to an exemplary embodiment of the present invention when viewed from the bottom. FIG. 7 shows a cross-sectional view of a connector 10 according to an exemplary embodiment of the present invention. FIG. 8 shows an illustrative perspective view of the terminals 10, 20, 30 and an electromagnetic shield 40 oriented as they would be within the connector 10 according to an exemplary embodiment of the present invention. FIG. 11 shows a cross-sectional view of the connector 10, the mounting panel 200, and the circuit board 300 according to an exemplary embodiment of the present invention.

As shown in FIGS. 1-11, the connector 10 further includes a sealing ring 134, which is provided around the tongue part 120 and the installation opening 202, and is pressed between the base part 130 and the mounting panel 200 to seal the installation opening. An accommodation groove 133 for accommodating the seal ring 134 is formed on the bottom surface of the base part 130. The seal ring 134 is installed and positioned in the accommodation groove 133 of the base part 130. The accommodation groove 133 surrounds the tongue part 120. The connection hole 131 and the first positioning post 135 are located outside the area surrounded by the accommodation groove 133 and spaced apart from the accommodation groove 133 by a predetermined distance.

The body part 110 of the housing 100 extends along the first direction Y (horizontal direction in the figure). The tongue part 120 of the housing 100 is formed on the bottom of the base part 130 and extends along the second direction Z (vertical direction in the figure) perpendicular to the first direction Y. Therefore, in the illustrated embodiment, the entire housing 100 is L-shaped when viewed from the side. The base part 130 is formed on the bottom of the body part 110 and has a predetermined thickness in the second direction Z. The base part 130 extends beyond the body part 110 in a third direction perpendicular to the first direction Y and the second direction Z.

The terminals 10, 20, 30 are provided within the housing 100. First ends 10*a*, 20*a*, 30*a* of the terminals 10, 20, 30 extend from the tongue part 120 and are electrically connected to the circuit board 300. The terminals 10, 20, 30 include signal terminals 10, 20 for transmitting signals and power supply terminals 30 for transmitting power. In the illustrated embodiment, the signal terminals 10, 20 include a first signal terminal 10 and a second signal terminal 20.

The first signal terminal 10 is used to transmit a first signal, for example, an Ethernet signal. The second signal terminal 20 is used to transmit a second signal different from the first signal, for example, a local area network (LAN) signal. The electromagnetic shield 40 for isolates the first signal terminal 10 from the power supply terminal 30. The circuit board 300 includes a positioning hole adapted to mate with the second positioning post 220 on the mounting panel 200. The circuit board 300 is mounted on the other side of the mounting panel 200 and electrically connected to the terminals 10, 20.

The base part 130 of the housing 100 is rectangular in cross-section perpendicular to the second direction Z, and the connection hole 131 is formed at each corner of the base part 130. A plurality of positioning posts 135, for example, two as shown, are formed on the bottom surface of the base part 130. The plurality of positioning posts 135 are used to fit with a plurality of positioning holes on the mounting panel 200, respectively. For example, the housing 100 may be an integrally injection molded part. However, the present invention is not limited to the illustrated embodiment, and the housing 100 may be an integral machined part or an integral 3D printed part.

Each terminal 10, 20, 30 is bent into an L-shape, and each terminal 10, 20, 30 includes a first portion 11, 21, 31 and a second portion 12, 22, 32. The first portions 11, 21, 31 of the terminals 10, 20, 30 are provided in the body part 110 of the housing 100 and extend in the first direction Y. The second portions 12, 22, 32 of the terminals 10, 20, 30 are respectively connected to the first portions 11, 21, 3 and extend through the base part 130 and the tongue part 120 of the housing 100 in the second direction Z.

The electromagnetic shield 40 is an integrally formed piece, and includes a first shield portion 41 and a second shield portion 42. The first shielding portion 41 is provided in the body part 110 of the housing 100 and extends in the first direction Y. The second shield portion 42 is connected to the first shield portion 41 and extends through the base part 130 and the tongue part 120 of the housing 100 in the second direction Z. In the illustrated embodiment, the first portion 11 of the first signal terminal 10 is accommodated in the first shield portion 41, and the second portion 12 of the first signal terminal 10 is accommodated in the second shield portion 42.

The first ends 10*a*, 20*a*, 30*a* of each terminal 10, 20, 30 extends from the tongue part 120 of the housing 100 for electrically connecting to the circuit board 300. In addition, the electromagnetic shield 40 also has a connecting pin 40*a* extending from the tongue part 120 of the housing 100 to be connected to the circuit board 300.

In an exemplary embodiment of the present invention, there is also disclosed a connector assembly including the aforementioned connector and a mating connector adapted to mate with the aforementioned connector.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:
- a housing adapted to be mounted on a mounting panel, including:
  - a body;
  - a base formed on a bottom of the body and adapted to be fixed on one side of the mounting panel, a first positioning post is formed on the base for mating with a first positioning hole formed in the mounting panel to locate the housing at a predetermined position with respect to the mounting panel; and
  - a tongue protruding from the bottom of the base and adapted to pass through an installation opening formed in the mounting panel to connect a circuit board; and
- a terminal fixed within the housing.

2. The connector according to claim 1, wherein a connection hole is formed in the base, and the housing is adapted to be fixedly connected to the mounting panel via a threaded member passing through the connection hole.

3. The connector according to claim 2, further comprising a metal bushing fitted in the connection hole of the base, the threaded member passing through the metal bushing.

4. The connector according to claim 2, further comprising a sealing ring arranged around the tongue and the installation opening, the sealing ring adapted to be pressed between the base and the mounting panel to seal the installation opening.

5. The connector according to claim 4, wherein the base includes an accommodation groove receiving the sealing ring on the bottom surface of the base, the connection hole and the first positioning post are located outside an area surrounded by the accommodation groove and spaced apart from the accommodation groove by a predetermined distance.

6. The connector according to claim 1, wherein the body extends along a first direction, and the tongue extends along a second direction perpendicular to the first direction such that the housing has an L-shape.

7. The connector according to claim 6, wherein the base has a predetermined thickness in the second direction and extends beyond the body in a third direction perpendicular to the first direction and the second direction.

8. The connector according to claim 1, wherein the housing is an integral part.

9. The connector according to claim 1, wherein one end of the terminal extends out of the tongue and is adapted to be electrically connected to the circuit board.

10. The connector according to claim 1, wherein the terminal includes a signal terminal for transmitting signals and a power supply terminal for transmitting power, the signal terminal including:

a first signal terminal for transmitting a first signal; and a second signal terminal for transmitting a second signal different from the first signal.

11. The connector according to claim 10, further comprising an electromagnetic shield provided in the housing, wherein the first signal terminal transmits an Ethernet signal and the electromagnetic shield isolates the first signal terminal from the power supply terminal.

12. A connector assembly, comprising:

a mounting panel formed with an installation opening; and a connector, comprising:

a housing mounted on the mounting panel, including:

a body;

a base formed on a bottom of the body and fixed to one side of the mounting panel, a first positioning post formed on the base and mating with a first positioning hole formed in the mounting panel to locate the housing at a predetermined position with respect to the mounting panel; and a tongue protruding from the bottom of the base and passing through the installation opening formed in the mounting panel to connect a circuit board; and a terminal fixed in the housing.

13. The connector assembly according to claim 12, wherein the mounting panel comprises:

a plate-shaped body having a first surface and a second surface opposite to the first surface in a thickness direction of the plate-shaped body; and a mounting boss formed on the first surface of the plate-shaped body and protruding by a predetermined height with respect to the first surface, the base part fixed to an installation surface of the mounting boss, the first positioning hole and the installation opening formed in the mounting boss.

14. The connector assembly according to claim 13, wherein a threaded hole is formed in the mounting boss, and the connector assembly further comprises a threaded member which passes through the connection hole of the housing and is threaded into the threaded hole of the mounting boss for fixing the housing to the mounting panel.

15. The connector assembly according to claim 13, wherein a second positioning post and a support post for supporting the circuit board are formed on the second surface of the plate-shaped body, the support post is adapted to support the circuit board at a position distanced from the second surface of the plate-shaped body by a predetermined distance.

16. The connector assembly according to claim 15, wherein the second positioning post comprises:

a post end adapted to be inserted into the positioning hole of the circuit board to position the circuit board; and a post base having a diameter larger than that of the post end and arranged coaxially with the post end, an end surface of the support post and an end surface of the post base arranged in the same plane for supporting the circuit board.

17. The connector assembly according to claim 12, further comprising a circuit board formed with a positioning hole and mating with a second positioning post on the mounting panel, the circuit board mounted on the other side of the mounting panel opposite the housing and electrically connected to the terminal and an electromagnetic shield of the connector.

18. A connector assembly, comprising:

a mounting panel defining a connector installation opening;

a connector, comprising:

a housing mounted on the mounting panel, including:

a body; and a base formed on a bottom of the body and fixed on one side of the mounting panel, a first positioning element formed on the base and mating with complementary second positioning element formed in the mounting panel to locate the housing in a predetermined position with respect to the mounting panel; and a circuit board formed with a third positioning element mating with a fourth positioning element of the mounting panel, the circuit board mounted on a side of the mounting panel opposite the housing and electrically connected to a terminal of the housing through the installation opening.

19. The connector assembly according to claim 18, further comprising a sealing ring arranged around the installation opening and pressed between the base and the mounting panel.

20. The connector assembly according to claim 19, wherein the base includes a groove formed in the bottom surface and accommodating the sealing ring.

* * * * *